United States Patent
Dos Santos Borges et al.

(10) Patent No.: US 11,427,302 B2
(45) Date of Patent: Aug. 30, 2022

(54) CLOSURE FAIRINGS FOR WING LEADING EDGE SLAT TRACK OPENINGS

(71) Applicant: YABORÃ INDÚSTRIA AERONÁUTICA S.A., São José dos Campos (BR)

(72) Inventors: Égon Dos Santos Borges, São José dos Campos (BR); Luiz Flavio Fernandes, São José dos Campos (BR); Alexandre Takao Motoyama, São José dos Campos (BR); Henrique Fonseca De Araujo, São José dos Campos (BR); Nilson Luiz David, São José dos Campos (BR); Rodrigo Milaré Granzoto, São José dos Campos (BR); Gilberto Guerra Becker, São José dos Campos (BR)

(73) Assignee: YABORÃ INDÚSTRIA AERONÁUTICA S.A., São José Dos Campos (BR)

( * ) Notice: Subject to any disclaimer, the term of this patent is extended or adjusted under 35 U.S.C. 154(b) by 44 days.

(21) Appl. No.: 16/819,794

(22) Filed: Mar. 16, 2020

(65) Prior Publication Data
US 2020/0307771 A1 Oct. 1, 2020

Related U.S. Application Data

(60) Provisional application No. 62/827,324, filed on Apr. 1, 2019.

(51) Int. Cl.
*B64C 9/22* (2006.01)
*B64C 3/50* (2006.01)

(52) U.S. Cl.
CPC . *B64C 9/22* (2013.01); *B64C 3/50* (2013.01)

(58) Field of Classification Search
CPC .... B64C 9/22; B64C 9/24; B64C 3/50; B64C 9/02; B64C 7/00; B64C 3/00; B64C 3/28; B64D 15/04
See application file for complete search history.

(56) References Cited

U.S. PATENT DOCUMENTS

| | | | | |
|---|---|---|---|---|
| 2,312,546 A * | 3/1943 | Hazard | ..................... | B64C 9/00 244/90 R |
| 3,244,384 A * | 4/1966 | Bracka | ...................... | B64C 9/22 244/210 |
| 5,362,347 A * | 11/1994 | Domine | .................. | B29C 66/72 156/212 |
| 5,622,336 A * | 4/1997 | Chavanne | ................. | B64C 9/02 244/129.1 |
| 8,511,619 B2 * | 8/2013 | Mann | ........................ | B64C 9/22 244/214 |
| 9,446,836 B2 * | 9/2016 | Pitt | ........................... | B64C 7/00 |
| 2002/0109048 A1 * | 8/2002 | Bliesner | .................... | B64C 9/22 244/214 |
| 2004/0145080 A1 * | 7/2004 | Tanaka | ..................... | B64C 9/00 264/257 |

(Continued)

*Primary Examiner* — Assres H Woldemaryam
(74) *Attorney, Agent, or Firm* — Nixon & Vanderhye P.C.

(57) ABSTRACT

An aircraft wing is provided with a positionally fixed closure fairing to close a cut-out opening in the leading edge of the wing associated with a wing leading edge slat so as to direct incident airflow to the wing leading edge from a lower surface of the aircraft wing to an upper surface of the aircraft wing.

5 Claims, 6 Drawing Sheets

(56) References Cited

U.S. PATENT DOCUMENTS

| | | | | |
|---|---|---|---|---|
| 2011/0006155 A1* | 1/2011 | Kracke | ................... | B64C 9/22 244/99.3 |
| 2011/0290946 A1* | 12/2011 | Peirce | ...................... | B64C 9/22 244/213 |
| 2012/0012712 A1* | 1/2012 | Eden | ........................ | B64C 9/22 244/201 |
| 2020/0148331 A1* | 5/2020 | Bensmann | ............... | B64C 9/02 |

* cited by examiner

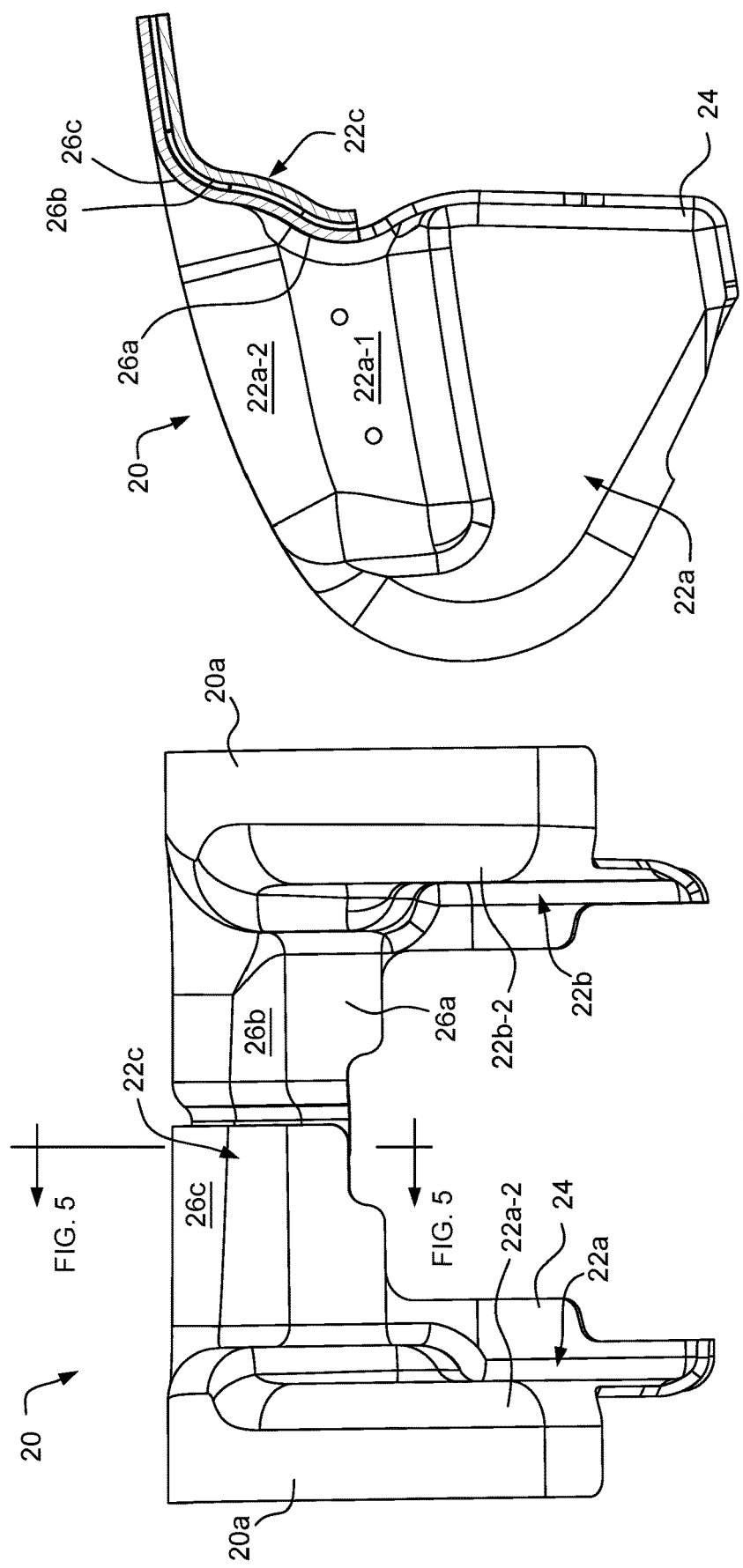

CLOSURE FAIRINGS FOR WING LEADING EDGE SLAT TRACK OPENINGS

CROSS-REFERENCE TO RELATED APPLICATION

This application is based on and claims domestic priority benefits of U.S. Provisional Application Ser. No. 62/827,324 filed on Apr. 1, 2019, the entire contents of each of which are expressly incorporated hereinto by reference.

FIELD

The embodiments disclosed herein relate generally to aircraft wings having wing leading edge slats. More specifically, the embodiments disclosed herein relate to fixed closure fairings whereby a cut-out opening in the wing leading edge skin associated with a slat track of a leading edge slat is closed when the leading edge slat is deployed.

BACKGROUND

The wing leading edge slat is a movable high-lift aerodynamic surface located forwarding of the wing leading edge. Most modern transport category aircraft can include, for example, between eight and twelve slat panels that are deployed when needed (e.g., during landing and take-off operations) to increase lift of the wings. It is common to use movable arcuate slat tracks attached to the individual slat panels as a mechanism to extend the slat panels between their retracted and deployed conditions relative to the wing leading edge, with each slat panel moving around an artificial axis located at the center of the slat track radius. The actuation of the slat tracks is typically accomplished by a gear coupling between the track and a pinion on each track station which is driven by torque tubes connected to an electric motor located in the aircraft's fuselage. Each slat track is typically supported by two pairs of lateral rollers located in the inboard and outboard leading edge rib to absorb the lateral loads and to smoothly guide the slat track during movement.

It can be appreciated that when the leading edge wing slat is deployed, it will expose a cut-out opening in the wing leading edge skin to the oncoming incident airflow thereby potentially impacting aerodynamic performance of the slat and/or wing. It would therefore be highly desirable if the cut-out opening could be covered substantially by a closure device when the leading wing edge slat is deployed so as to minimize (if not alleviate entirely) adverse aerodynamic performance impacts. It is towards providing such solutions that the embodiments disclosed herein are directed.

SUMMARY

Generally, the embodiments disclosed herein are directed toward closure fairings whereby the cut-out opening in the wing leading edge skin associated with the slat track of a leading edge slat is substantially covered when the leading edge slat is deployed.

According to some embodiments disclosed herein, an aircraft wing having a wing leading edge is provided with a cut-out opening and a closure fairing positionally fixed to the wing leading edge to close the cut-out opening when the wing leading edge slat is moved from a retracted condition to a deployed condition thereof. The closure fairing defines aerodynamic surfaces to direct incident airflow to the wing leading edge from a lower surface of the aircraft wing to an upper surface of the aircraft wing.

Some embodiments of the closure fairing will include a substantially U-shaped fairing structure comprising a base region and opposed side regions outwardly extending from the base region. The closure fairing may define a generally U-shaped opening which is sized and configured to accommodate a slat track associated with a wing leading edge slat.

Certain embodiments of the closure fairings will provide a base region with a convexly curved surface above the U-shaped opening, while other embodiments may include a concavely curved surface between the U-shaped opening and the convexly curved surface. An especially preferred embodiment of the closure fairing will provide a base region thereof with lower and upper convexly curved surfaces above the U-shaped opening, and a concavely curved surface joining the lower and upper convexly curved surfaces.

The closure fairing may be an integral structure having an angle of attack of about 90°

These and other aspects and advantages of the present invention will become more clear after careful consideration is given to the following detailed description of the preferred exemplary embodiments thereof.

BRIEF DESCRIPTION OF ACCOMPANYING DRAWINGS

The disclosed embodiments of the present invention will be better and more completely understood by referring to the following detailed description of exemplary non-limiting illustrative embodiments in conjunction with the drawings of which:

Figure 1:
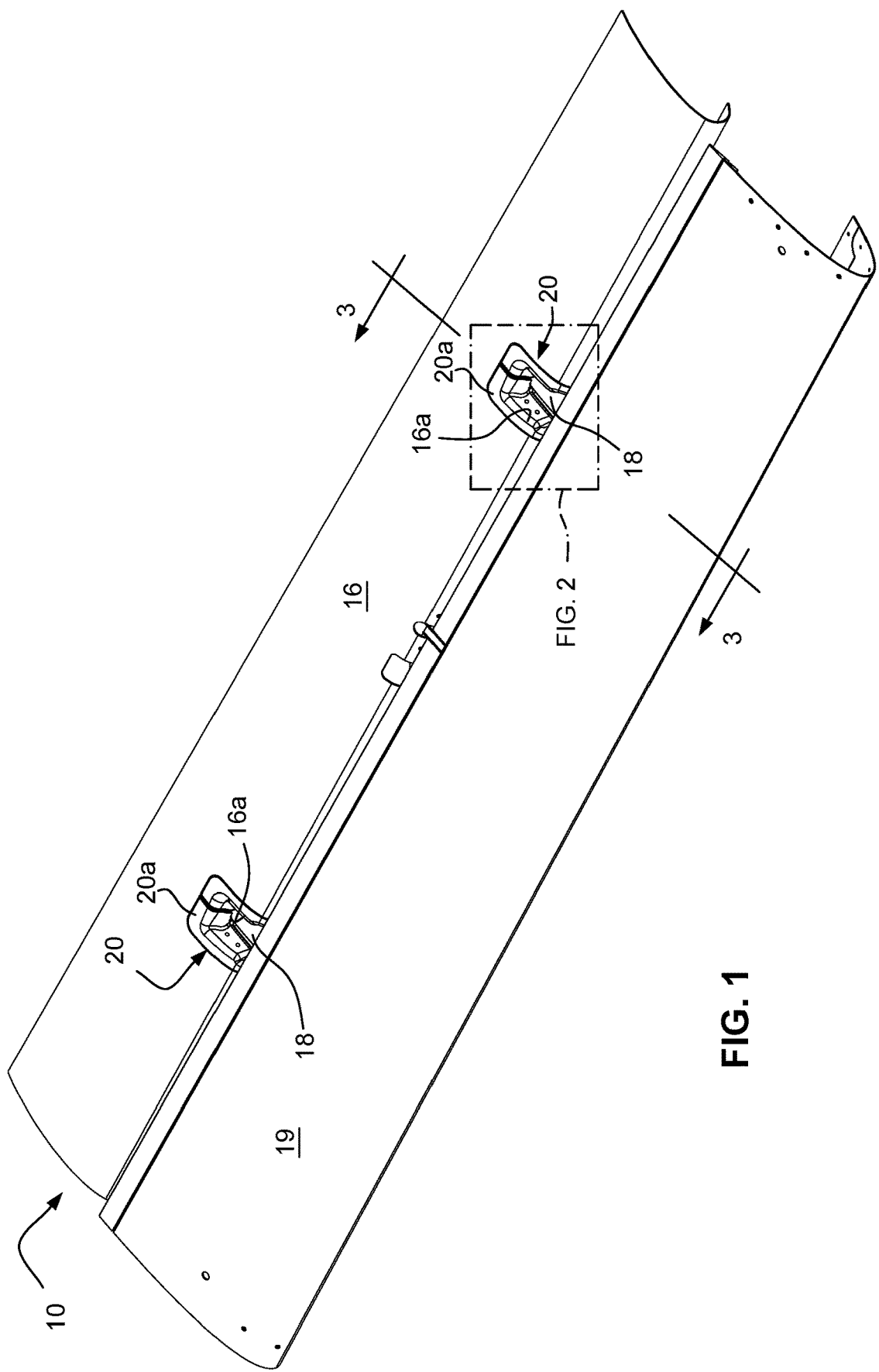
FIG. 1 is a perspective view of a section of an aircraft wing leading edge and associated leading edge slat depicting an embodiment of the closure fairings in accordance with the invention to close the wing leading edge cut-out for the slat track.
Figure 7:
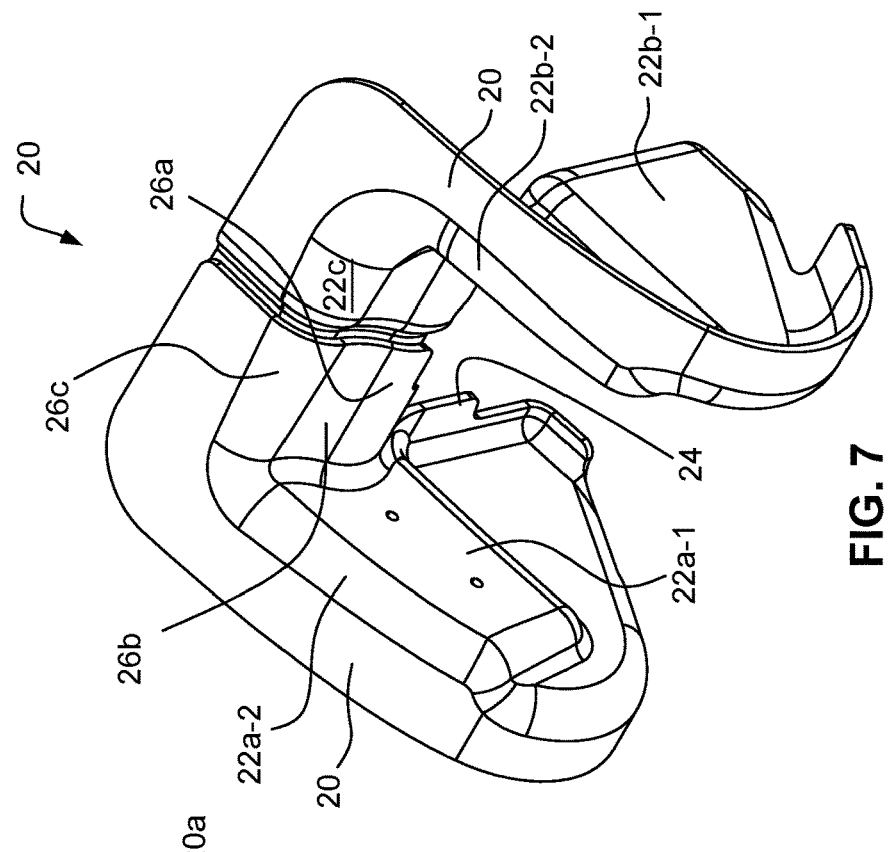
Figure 6:
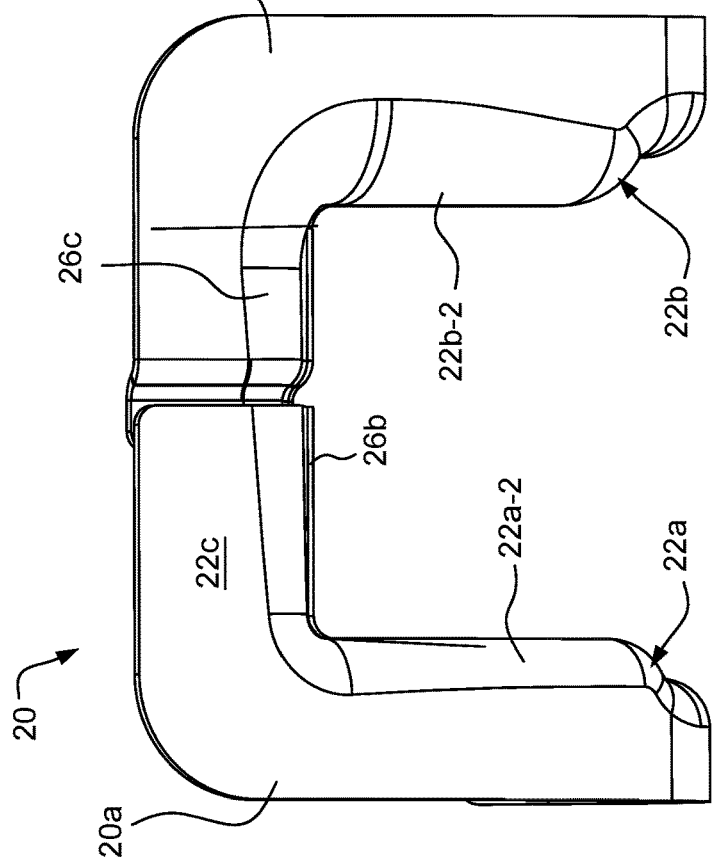
Figure 8:
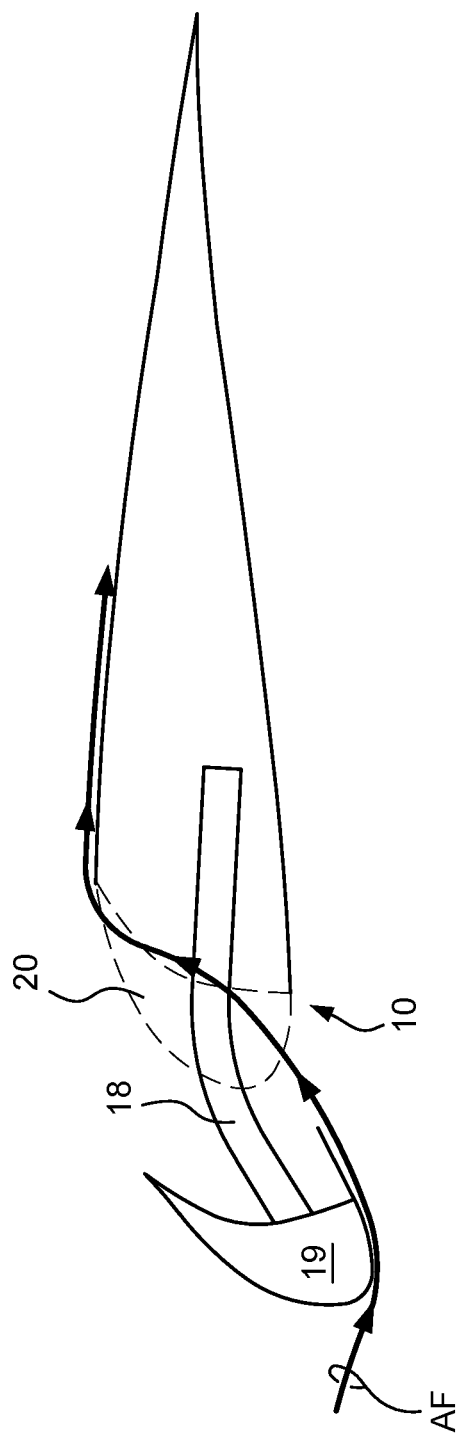

FIGS. 4-7 are enlarged views of the closure fairing employed in the wing leading edge shown in FIG. 1 where FIG. 4 is a front elevational view thereof, FIG. 5 is a left interior side cross-sectional elevational view thereof as taken along lines 5-5 in FIG. 4, the right side cross-sectional elevational view being a mirror image thereof, FIG. 6 is a top plan view thereof and FIG. 7 is a perspective view thereof; and FIG. 8 is a schematic cross-sectional view of the wing leading edge and associated edge slat in a deployed condition showing the airflow in the region of the closure fairing.

DETAILED DESCRIPTION OF EMBODIMENTS

Figure 2:
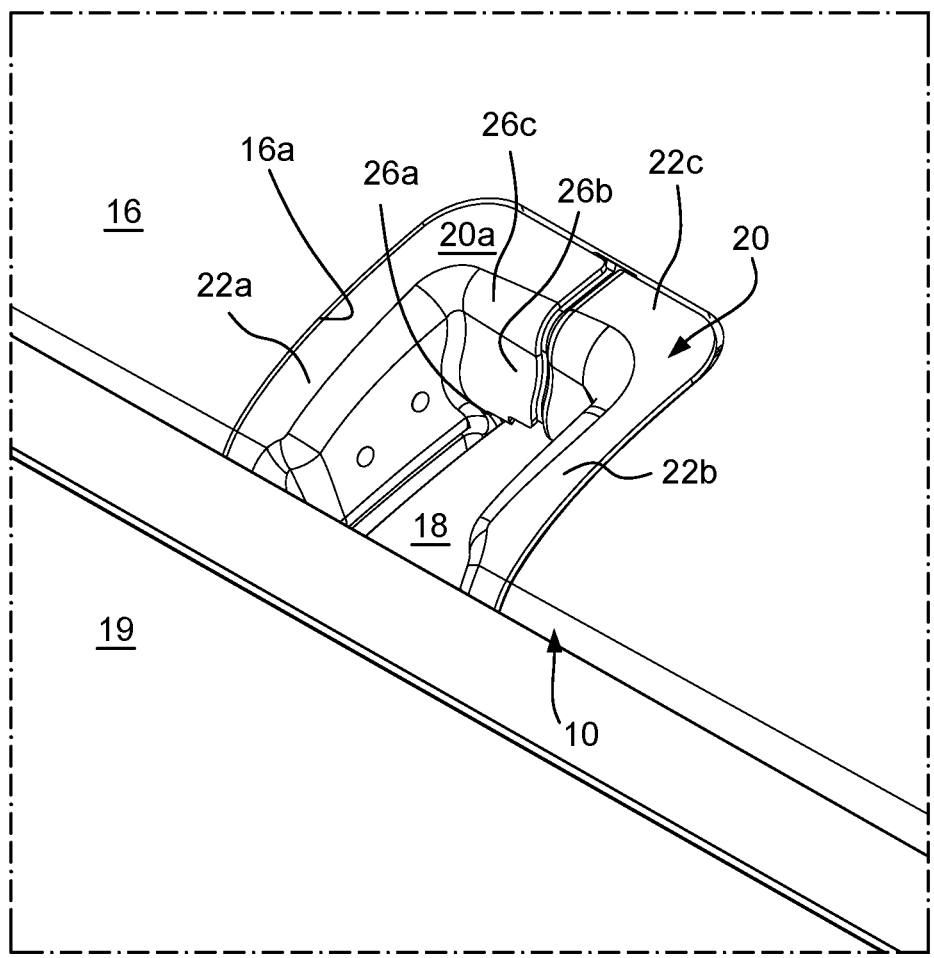
FIG. 2 is an enlarged perspective view of a representative closure fairing as shown in FIG. 1.
Figure 3:
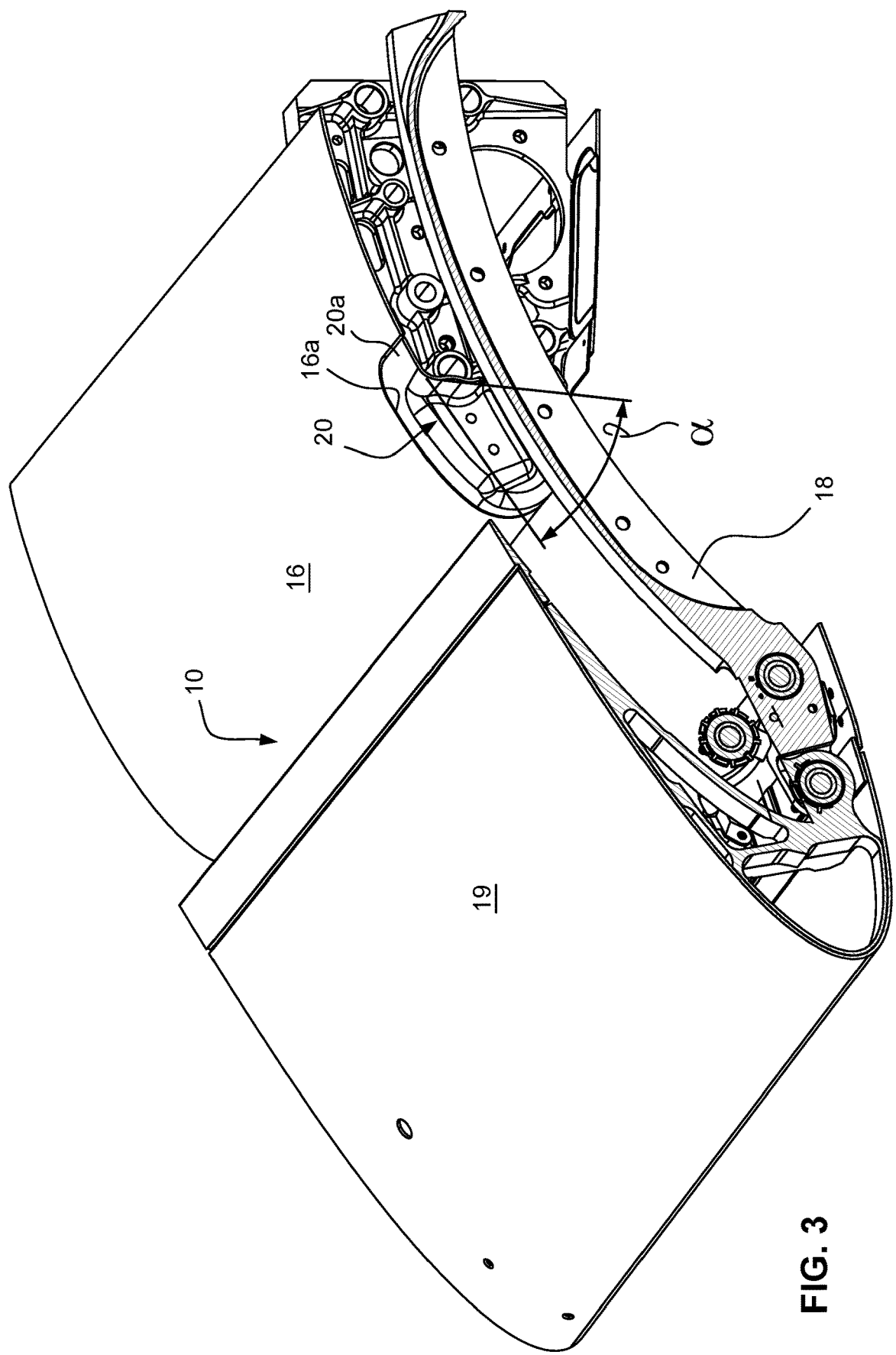
FIG. 3 is cross-sectional view of the wing leading edge shown in FIG. 1 as taken along lines 3-3 therein.

Accompanying FIGS. 1-3 depict a wing leading edge 10 that includes a skin 16 which is provided with a slat track cut-out opening 16a to allow movement of an arcuate slat track 18 operably associated with the leading edge 10 between retracted and extended positions thereof (i.e., so as to move a wing leading edge slat 19 between its retracted and deployed conditions, respectively, relative to the leading edge 10). The leading edge 10 is provided with a closure fairing 20 which closes the cut-out opening 16a yet allows the slat track 18, and hence the slat 19, to be moved between the retracted and deployed conditions. The closure fairing 20 includes a U-shaped top flange wall 20a attached to the skin 16.

As is perhaps better shown in FIGS. 4-7, the closure fairing 20 is positionally fixed to the aircraft leading edge 10 and defines a generally U-shaped integral fairing structure having opposed side regions 22a, 22b and an aft base region 22c from which the side regions forwardly extend. The opposed side regions 22a, 22b are provided with respective side walls 22a-1, 22b-1 and upper convexly curved transition walls 22a-2, 22b-2 joining the side walls 22a-1, 22b-1 to an adjacent region of the top flange wall 20a. The base region 22c is positioned adjacent an aft portion of the cut-out opening 16a and defines a generally U-shaped opening 24 which is sized and configured to closely conform to the cross-sectional profile of the slat track 18.

The base region 22c includes a series of curved surfaces 26a-26c extending upwardly from the opening 24 for the slat track 18 in a generally aftwise direction. Specifically, it will be observed that lower and upper convexly curved surfaces 26a and 26c are respectively joined to a concavely curved intermediate surface 26b. These surfaces 26a-26c of the closure device 20 will thereby provide the device with aerodynamic geometry that guides the oncoming incident airflow AF from the lower region of the wing 10 to the upper region thereof as is schematically depicted in FIG. 8. The radius of curvature for the surfaces 26a-26c can be the same or different as compared to one another depending on the particular aerodynamic requirements associated with the wing 10. The curved surface 26c may have an angle of attack α of up to about 90° (see FIG. 3).

While reference is made to a particular embodiment of the invention, various modifications within the skill of those in the art may be envisioned. Therefore, it is to be understood that the invention is not to be limited to the disclosed embodiment, but on the contrary, is intended to cover various modifications and equivalent arrangements included within the spirit and scope thereof.

What is claimed is:

1. An aircraft wing comprising:
   a wing leading edge;
   a cut-out opening in a section of wing skin of the wing leading edge;
   a closure fairing positionally fixed to the wing leading edge and defining surfaces to direct incident airflow to the wing leading edge from a lower surface of the aircraft wing to an upper surface of the aircraft wing,
   a wing leading edge slat, and
   an elongate slat track attached to the leading edge slat, the slat track being operably moveable relative to the closure fairing to allow movement of the wing leading edge slat from a retracted position to a deployed condition thereof, wherein
   the closure fairing comprises:
   (i) a U-shaped top flange attached to the section of wing skin of the wing leading edge,
   (ii) a base region positioned adjacent an aft portion of the cut-out opening in the wing leading edge, the base region defining a U-shaped opening sized and configured to accommodate a cross-sectional profile of the slat track, the base region including lower and upper convexly curved surfaces above the U-shaped opening, and a concavely curved surface joining the lower and upper convexly curved surfaces, and
   (iii) opposed side regions forwardly extending from the base region, wherein each of the opposed side regions includes a side wall and a convexly curved transition wall joining the top and side walls.

2. The aircraft wing according to claim 1, wherein the base region includes a concavely curved surface between the U-shaped opening and the convexly curved surface.

3. The aircraft wing according to claim 1, wherein the closure fairing is an integral structure.

4. The aircraft wing according to claim 1, wherein the closure fairing has an angle of attack of up to 90°.

5. An aircraft which comprises the aircraft wing according to claim 1.

* * * * *